United States Patent
Stroop

(10) Patent No.: US 12,287,014 B2
(45) Date of Patent: Apr. 29, 2025

(54) BEARING ARRANGEMENT

(71) Applicant: ONDAL MEDICAL SYSTEMS GMBH, Hünfeld (DE)

(72) Inventor: Nicolas Stroop, Bielefeld (DE)

(73) Assignee: ONDAL MEDICAL SYSTEMS GMBH, Hünfeld (DE)

( * ) Notice: Subject to any disclaimer, the term of this patent is extended or adjusted under 35 U.S.C. 154(b) by 825 days.

(21) Appl. No.: 17/202,889

(22) PCT Filed: Sep. 17, 2019

(86) PCT No.: PCT/EP2019/074911
§ 371 (c)(1),
(2) Date: Mar. 16, 2021

(87) PCT Pub. No.: WO2020/058292
PCT Pub. Date: Mar. 26, 2020

(65) Prior Publication Data
US 2021/0356004 A1 Nov. 18, 2021

(30) Foreign Application Priority Data

Sep. 17, 2018 (EP) .................................. 18194937

(51) Int. Cl.
*F16D 55/02* (2006.01)
*F16C 19/38* (2006.01)
(Continued)

(52) U.S. Cl.
CPC ............ *F16D 55/02* (2013.01); *F16C 19/386* (2013.01); *F16C 41/001* (2013.01); *F16D 59/02* (2013.01); *F16D 65/186* (2013.01)

(58) Field of Classification Search
None
See application file for complete search history.

(56) References Cited

U.S. PATENT DOCUMENTS

2003/0087703 A1   5/2003  Lohmuller et al.
2008/0314701 A1* 12/2008  Bogelein ................. F16D 55/28
                                                                 188/171
(Continued)

FOREIGN PATENT DOCUMENTS

CN   107072862 A  *  8/2017  ............. A61B 90/06
DE   1046421 B      12/1958
(Continued)

OTHER PUBLICATIONS

CN-107072862-A—English Machine Translation (Year: 2017).*

*Primary Examiner* — Melanie Torres Williams
(74) *Attorney, Agent, or Firm* — MEDLER FERRO WOODHOUSE & MILLS PLLC

(57) ABSTRACT

The invention relates to a bearing arrangement (10) having at least one first bearing element (12) and one second bearing element (14), which are connected to each other rotatably relative to each other along a common longitudinal axis (16), wherein the bearing element (10) comprises a braking device (24) which inhibits the relative rotation of the two bearing elements (12, 14) to each other, wherein the braking device (24) comprises a brake element (26) connected to the first bearing element (12), a counter surface (34) connected to the second bearing element (14), and at least one spring element (44) which presses the brake element (26) against the counter surface (34) using the spring force for generating a frictional engagement, and an actuable adjustment device (42), by means of which a contact force by which the brake element (26) is pressed against the counter surface (34) may be reduced, wherein the counter surface (34) is arranged on an extension (38) of the second bearing element (14), which is oriented transversely, in particular perpendicular, to the effective direction of the (Continued)

contact force, wherein said extension (38) is formed integrally with the second bearing element (14).

<div align="center">15 Claims, 1 Drawing Sheet</div>

(51) Int. Cl.
  *F16C 41/00*   (2006.01)
  *F16D 59/02*   (2006.01)
  *F16D 65/18*   (2006.01)

(56) References Cited

<div align="center">U.S. PATENT DOCUMENTS</div>

| | | | |
|---|---|---|---|
| 2010/0104234 A1 | 4/2010 | Nuissl et al. | |
| 2011/0019953 A1* | 1/2011 | Nuissl | F16C 41/001 |
| | | | 384/572 |

<div align="center">FOREIGN PATENT DOCUMENTS</div>

| | | | | |
|---|---|---|---|---|
| DE | 3234718 A1 | 4/1983 | | |
| DE | 3402522 A1 | 8/1985 | | |
| DE | 19500589 A1 | 7/1996 | | |
| DE | 102006004065 A1 * | 8/2007 | ............. | B60T 13/04 |
| DE | 102008017262 A1 | 10/2009 | | |
| DE | 102012101530 A1 * | 8/2013 | ............. | B60T 1/062 |
| EP | 2140158 A1 | 1/2010 | | |
| EP | 2631127 A1 | 8/2013 | | |
| EP | 3042815 A1 * | 7/2016 | ............. | B60T 13/04 |
| JP | 2002005205 A | 1/2002 | | |
| WO | 2017028852 A1 | 2/2017 | | |

* cited by examiner

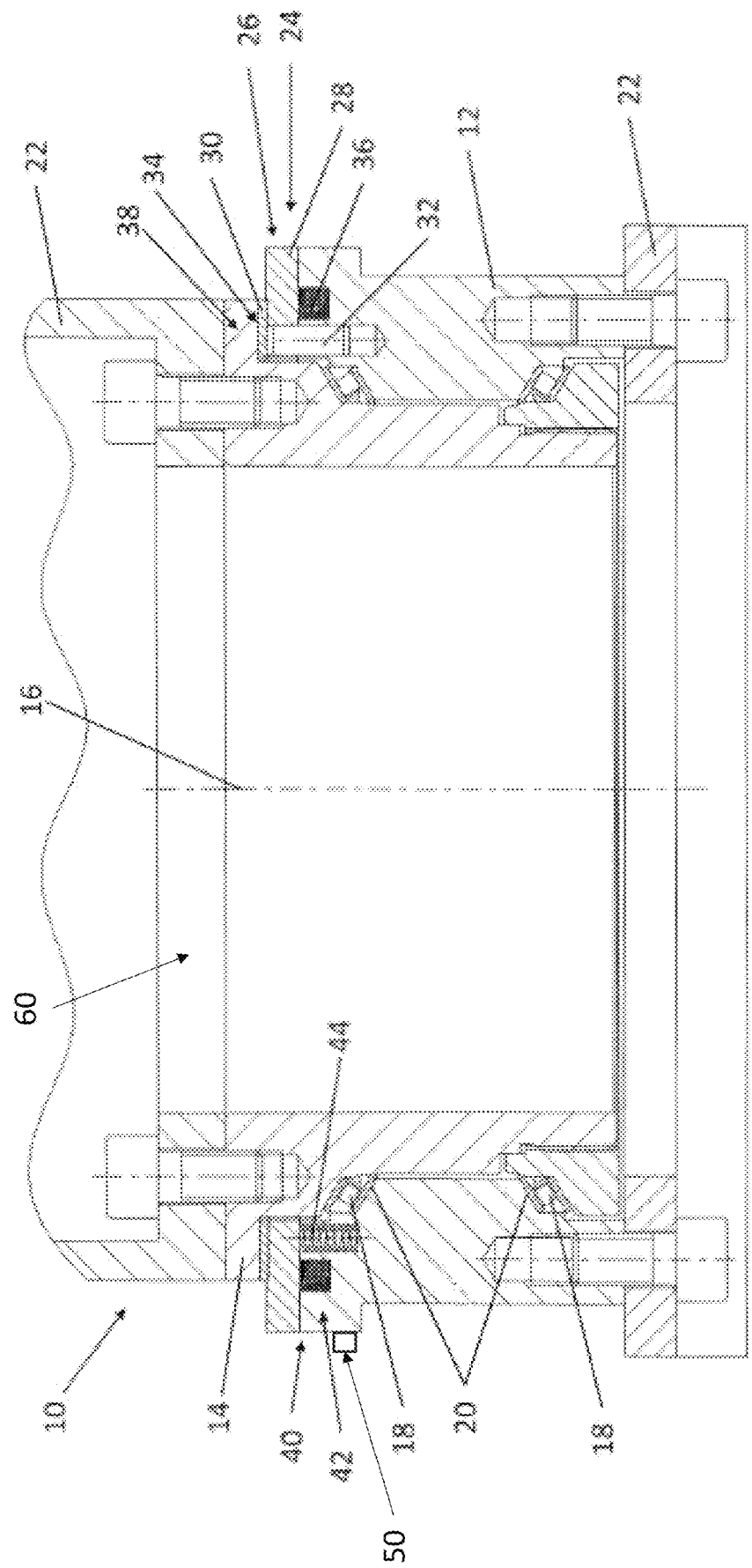

BEARING ARRANGEMENT

The invention relates to a bearing arrangement, in particular including a brake device.

For known electromagnetically actuated bearing units, an anchor plate having an attached friction pad is pressed against a counter surface, for example, a pressure plate, by biased pressure springs to inhibit a movement, in particular a rotation, of respective bearing elements to one another. The anchor plate is connected to a first casing part, which may be formed as stator, in a rotatably fixed way. The pressure plate is connected to a second casing part, which may be formed as rotor, in a rotatably fixed way. The friction pad may here be attached both on the anchor plate and also on the pressure plate.

In a braked state, the frictional force which has been generated by the contact force of the pressure springs generates a brake torque. For example, the brake torque inhibits an unintended movement of a carrier arm system which is movably supported by means of the bearing unit at least regarding one rotational degree of freedom. During an electromagnetic actuation of the bearing unit, which may also be denoted as an activation or release of the brake, current is applied to a strong solenoid, which is connected to the stator in a fixed way, for example. The resulting magnetic field acts against the pressure force of the springs and attracts the anchor plate. Pressing of the friction pad is thus ended, and stator and rotor may then be rotated against each other by using little force. Distinctive for this operating principle is that the contact force which causes the brake torque corresponds to the force which the solenoid has to generate to release the brake. Thus, for a high brake torque, the solenoid has to be dimensioned as correspondingly strong, and the currents within a coil of the solenoid are correspondingly high. Also, the gap between the solenoid and the anchor plate is decisive for functioning at high brake torques, as the magnetic force decreases strongly with the distance to the magnet. This puts high requirements on manufacturing accuracy and mounting effort, in particular to keep the gap small. For example, for adjustment of the gap, a fine thread having small pitch between the pressure plate and the casing is provided, which is complex to manufacture.

Here, the position of the pressure plate on the fine thread is fixed after adjustment of the position by means of an adhesive, which results in a very expensive maintenance. In addition, the adjustment of the position has to be very precise in order to ensure an exact fit of the gap. Otherwise, in case the distance is too large, the magnetic force generated by the magnet may be too weak to counteract the spring force sufficiently to cancel the brake effect. However, if the distance is too small, an undesired sliding contact may occur, which damages the bearing. In addition, the anchor plate may then no longer lift far enough from a counter surface corresponding to the brake pad, and thus also when releasing the brake, a frictional force may be generated during relative rotation of the respective bearing elements to each other which is too high.

A further known design solution for fixing or braking a bearing unit is the usage of a flexible pressure hose which expands when applying a pneumatic interior pressure. The expansion results in a contact force on the rotor and stator, and generates a frictional force on the effective surfaces which inhibits the rotation movement. The pressure hose may for example assume the function of the springs and the solenoid. A disadvantage regarding said solution is that during a movement of a carrier arm system which is supported by means of the bearing unit, when the brake is not to released, an abrasive wear occurs on the effective surfaces being moved relative to each other of the pressure hose, which is also denoted as pneumatic hose. Said abrasive wear may lead to a leaking of the pressure hose, which is also denoted as a brake hose. Thus, the durability of the bearing unit may be low, and/or respective maintenance intervals may be short. A similar effect may occur by cracks on the respective crimp sites of the elastic hose, on which it is attached. Maintenance of a defect brake hose is an expensive service effort.

A third known solution for fixing or braking a bearing unit is a friction brake unit, which is not releasable. Here, a permanent brake torque is generated between the rotor and the stator, which may not be released by the user. Generally, the brake torque is selected to such a high degree that the movement of a carrier arm system which is supported by the bearing unit is nevertheless possible, however unwanted movements are prevented in a quite reliable way. In some embodiments said brake torque is not adjustable, changes with an ongoing wear of the friction surfaces and may then no longer be correctable.

The described bearing units have in common that they provide a high variety of variants of parts and assemblies. In addition, due to this, the bearing units are costly and expensive to maintain.

For example, a bearing unit which may be actuated electromagnetically is described in EP 2 140 158 B1.

DE 10 2008 017 262 A1 describes a rolling bearing rotational connection including an integrated direct drive and optionally an integrated brake, for example a frictional brake. As rotational lock of such a friction brake a pin is mounted on an inner surface of an outer ring. Further, the friction brake comprises integrated springs for biasing thereof, which are radially spaced from the rotational lock. The springs and the pin are arranged on the axially opposite sides of the friction brake. The springs are correspondingly not guided by the pin.

JP 2002 005 205 A describes a bearing arrangement, in which spring elements and guiding elements are positioned on different diameters. The spring elements are correspondingly not guided by the pin elements.

EP 2 631 127 A1 describes a floor-conveyor vehicle including braked load rollers. An anchor plate is supported on a support trunnion or a middle shaft or a solenoid actuator, respectively. On the other hand, a spring device is arranged in the solenoid actuator. An arrangement outside of the actuator is not feasible due to the respective springs. The springs are not guided.

It is an object of the present invention to provide a bearing arrangement which is especially cost-efficient to manufacture, and in particular simple to mount.

The object is solved according to the invention by a bearing arrangement comprising the features of the independent claim. Advantageous embodiments of the invention are disclosed by the respective dependent claims.

The invention relates to a bearing arrangement having at least one first bearing element and one second bearing element, which are connected to each other rotatably relative to each other along a common longitudinal axis. The bearing arrangement may comprise a brake device which inhibits the relative rotation of the two bearing elements to each other by means of a frictional force generated by the brake device. The brake device may comprise a brake element connected to the first bearing element, a counter surface connected to the second bearing element, and at least one spring element. The spring element may be configured to press the brake element against the counter surface by means of the spring force for generating a frictional engagement. Preferably, the at least one spring element is integrated in a biased way. The frictional engagement causes a frictional force during a relative movement of the two bearing elements to each other.

Connected may denote here that the respective parts are connected to the respective bearing element in a stationary or rotatably fixed way, respectively. The counter surface may also be connected to the second bearing element in a way that it is formed on or as one of the upper surfaces thereof. For example, the counter surface may move together with the second bearing element which is configured as rotor, in case it is moved relative to the stator. In contrast, during such a movement of the rotor, the brake element may fixedly remain at its position together with the first bearing element which is configured as stator. The brake element and the counter surface may thus frictionally slide down on each other, and thus generate the frictional force counteracting the rotation due to the frictional engagement. The respective bearing element which is connected to the brake element or the counter surface, may thus be denoted as assigned bearing element. The counter surface may thus be formed as an upper surface of the second bearing element facing the brake element, or also as a part being fixed separately thereon, for example also a brake element. Respective brake elements may for example be configured as brake pads in order to provide a high frictional coefficient during sliding down. The brake pads may here be connected to the respective bearing elements e.g. by means of bonding or a screw connection.

Preferably, the bearing arrangement may also comprise an actuable adjustment device. By means of said adjustment device a contact force may be reduced by means of which the brake element is pressed against the counter surface due to the spring element. This way, the brake force which is effective during the relative rotation of the two bearing elements to each other may be modified. The adjustment device may here only reduce the contact force in order to adjust the strength of inhibiting the rotation of the respective bearing elements. Alternatively or in addition, the adjustment device may also act as a coupling device, which releases the frictional engagement and thus deactivates inhibition. Then, the two bearing elements may be rotated relative to each other in a fast and simple way by using only little force. For example, only the inherent friction of the bearing arrangement has to be overcome. In case, the bearing arrangement is formed as a roller bearing, only the rolling friction of the bearing elements on the rolling bodies has to be overcome. Due to biasing of the at least one spring element, thus the friction engagement may be automatically generated again once the adjustment device is no longer actuated.

For example, the adjustment device may comprise an actuator by means of which the contact force is reduced, which also counteracts against the spring force of the at least one spring element. For example, the actuator may comprise a solenoid or a pressure hose. By means of the actuator, the brake of the bearing arrangement may then be electrically or pneumatically released, for example. The maximum contact force and/or friction may be predetermined by the contact force of the respective spring elements, and the material pairing of the friction element and the counter surface. The adjustment device is for a temporary reduction of the brake force or the temporary cancelling of braking, and may thus be dimensioned according to the contact force of the respective spring elements.

The friction element may correspond to the brake element. The brake element may also comprise a friction element, formed as a brake pad, for example, which may also be denoted as friction pad. Correspondingly, a friction element may correspond to a friction pad. For example, a brake element may comprise a plate, in particular an anchor plate, onto which the friction pad or the friction element is arranged. The friction pad may be attached permanently or in a releasable way, for example by using a bonding or a screw connection. The friction element or the friction pad may form a friction surface, in particular on a side facing the counter surface.

The spring element may be configured as pressure spring, for example, in particular as a coil spring or a disk spring. Here, the spring force preferably acts basically normal to the counter surface and/or to a frictional surface of a friction element, which is in contact with the counter surface during frictional engagement. The counter surface and the friction element may form planar parallel corresponding friction surfaces.

Preferably, the counter surface is formed on an extension of a second bearing element which is transverse, in particular perpendicular to the effective direction of the contact force. The alignment of the extension results from the main extension direction of the extension, for example, and is preferably parallel to the counter surface. For example, the extension may be recognized by the fact that it serves no other purpose in the bearing arrangement than forming the counter surface. For example, except from inhibiting rotation, the bearing arrangement may also form a completely functional bearing without the extension. The extension is preferably formed integrally with the second bearing element.

By using the extension, a pressure plate, which is to be inserted separately, may be omitted. In particular, this eliminates the need for a time-consuming assembly on a fine thread, adjustment of the gap between the anchor plate and the solenoid, and bonding after said adjustment. Through-put-times during manufacturing may be significantly reduced, in particular due to the fact that curing times for an adhesive are eliminated in this way. Thus assembly and manufacturing may be particularly cost-efficient. This also eliminates the need to manufacture a thread in one of the respective bearing elements. In addition, the bearing arrangement may thus be easily mounted without special training, as the gap is basically predetermined by the design and does not need to be adjusted. Thus, the installation of the bearing arrangement is particularly simple for the buyers thereof.

Due to the extension, the diameter in the portion of the frictional engagement of the bearing arrangement, i.e. in the portion of counter surface and friction element, may be particularly large. This way, the respective friction surfaces being in contact during frictional engagement may be particularly large. Thus, the contact pressure required may be particularly low compared with conventional bearing arrangements, while the frictional torque remains constant. Accordingly, the surface pressure between the counter surface and the friction element may be particularly low. This may reduce abrasive wear. Respective spring elements may be formed weaker, which may reduce the required installation space. Accordingly, the adjustment device may also require less force to counteract the contact force. As a result, the actuator may be formed weaker, and may be correspondingly small and cost-efficient. For example, a solenoid may be smaller in size, which may also reduce a required length of an enameled copper wire. Correspondingly, the power required to release the brake may also be lower, thus a power supply unit may be dimensioned smaller, for example. Ensuring the exact minimum gap is also less relevant this way. For example, the solenoid may also be dimensioned to such a strong degree that the brake may be reliably released even if the gap is unusually large due to manufacturing tolerances. Here, due to the lower required contact force, the solenoid may however be as strong or weaker than in a bearing arrangement in which the gap is adjustable by means of a pressure plate and fine thread.

An axial direction of the bearing arrangement may be predetermined by the longitudinal axis thereof. A radial direction may be defined by a direction transversely, in particular perpendicular, to the longitudinal axis, for example. Radially inwards may be defined radially toward the longitudinal axis and radially outwards in a direction away from the longitudinal axis.

A further advantageous embodiment of the bearing arrangement provides that the brake element comprises an anchor disk and a friction surface formed thereon, wherein the anchor disk is connected to the first bearing element by means of at least one guiding element in a rotatably fixed, but axially movable way along the longitudinal axis. The friction surface may thus be formed as a friction pad on the anchor disk. Due to the embodiment including an anchor disk, the brake of the bearing arrangement may be released in a simple and reliable way, in particular by using simple actuators such as a solenoid. The friction surface may here for example be formed by a friction pad bonded or screwed on the anchor disk, thus it may be simply replaced in case of wear. If required, a replacement of the anchor disk may also be performed which may simply be removed from the respective guiding elements at a disassembled bearing. Respective guiding elements may for example be formed as guide pins which are arranged in the corresponding through-holes of the anchor disk. The guide pins may also be adapted as dowel pins. The main extension direction of the guide pins is preferably oriented in an axial direction along the longitudinal axis. The guide pins thus guide the movement of the anchor disk along the longitudinal axis in the axial direction. The anchor disk may also be adapted as an anchor plate, for example.

A further advantageous embodiment of the bearing arrangement provides that the adjustment device comprises a solenoid by means of which the anchor disk is axially movable against the spring force. A solenoid is an especially low-maintenance, robust and cost-efficient actuable actuator. Preferably, the anchor plate or anchor disk is made of a material which is attracted by the magnetic field which may be generated by the solenoid. During frictional engagement of the brake device, the solenoid is preferably arranged in an axially spaced way from the anchor disk on a side opposite of the counter surface. By energizing the solenoid, the anchor disk is then pulled to the solenoid, and thus the anchor disk is axially pulled away from the counter surface. This way, the frictional engagement may be released or the contact force of the friction element to the counter surface may thus also be reduced in order to cancel or reduce an inhibition of the relative rotation of the two bearing elements to each other.

A further advantageous embodiment of the bearing assembly provides that the at least one spring element is arranged essentially on the same diameter as the at least one guiding element. This way, the bearing arrangement may be especially compact. In addition, the respective guiding elements may also serve as respective guides of respective spring elements. For example, a coil spring may thus be protected against bending by means of the guide pin which is arranged in the center thereof. The diameter may here be defined relative to the longitudinal axis, in particular the radial distance hereto. Thus, the respective spring elements may essentially also comprise the same radial distance to the longitudinal axis as the respective guiding elements. Preferably, the respective spring elements and the respective guiding elements are arranged in the circumferential direction on corresponding positions, thus the support or guiding of the spring elements described above may be achieved. Preferably, a guiding element is provided for each spring element. Preferably, the guiding elements are configured as journals or guide pins around which the spring elements which are configured as coil springs, respectively, are arranged.

A further advantageous embodiment of the bearing arrangement provides that one of the two bearing elements is formed as inner ring and the other of the two bearing element is formed as outer ring. This way, the number of parts of the bearing arrangement may be especially low. For example, the bearing arrangement may be formed as a rolling bearing or a sliding bearing. Preferably, the second bearing element is formed as inner ring, as thus the radial dimension of the bearing arrangement has not be enlarged here despite of the extension. The extension may thus be formed as a section of the inner ring, for example, which extends axially further than the outer ring and projects here radially beyond the rest of the inner ring. This results in an at least partial axial overlapping between extension and outer ring. Preferably, the extension extends radially essentially at most just as far as the outer ring.

A further advantageous embodiment of the bearing arrangement provides that the extension is formed as a step on the second bearing element, in particular on the second bearing element which is formed as inner ring. A step may be in particular cost efficient and simple to manufacture, for example in case the second bearing element is a turned part.

A further advantageous embodiment of the bearing arrangement provides that a transition between the extension and the other second bearing element is formed in a curved or angular way. For example, the extension formed as the step may thus transition into the other second bearing element in a curved way or having a sharp edge, notch, and/or chamfer. The angular transition is here especially cost-efficient to manufacture, in particular on a lathe. In addition, this saves a lot of installation space. The angular transition may also be formed as a type of chamfer. The curved transition may receive especially high loads. This way, the extension may for example be thinner in the axial direction, thus the bearing arrangement may be especially compact, in particular in the axial direction.

A further advantageous embodiment of the bearing arrangement provides that the extension and/or the counter surface extend(s) radially, in particular perpendicular to the longitudinal axis by the main extension surface thereof. This results in an especially advantageous force flow and also alignment regarding the respective frictional forces. In addition, the bearing arrangement may be thus especially compact.

A further advantageous embodiment of the bearing arrangement provides that the counter surface and/or a corresponding friction surface of the friction element is arranged in a radially outer portion of the bearing assembly. This results in an especially large lever arm relative to the longitudinal axis, and thus an especially large inhibiting torque counteracting the relative movement of the two bearing elements due to the frictional force. Thus, the extension and/or respective friction surfaces may be especially small. In addition, the required contact force may be especially low for the same inhibiting moment, which leads to advantages regarding the dimensioning of the brake device and the adjustment device, in particular of the actuator thereof and of the gap. Preferably, the counter surfaces and/or the corresponding friction surfaces of the friction element are arranged in the radially outmost portion of the bearing arrangement.

A further advantageous embodiment of the bearing arrangement provides that the second bearing element, in particular the extension thereof, extends essentially radially to the outside at most just as far as the first bearing element and/or the brake element, in particular the anchor disk thereof. This results in an especially compact design of the bearing arrangement due to the axial overlapping. Preferably, the inner ring extends radially as far to the outside as the outer ring. The inner ring may extend axially further inwards than the outer ring.

A further advantageous embodiment of the bearing arrangement provides that the adjustment device comprises a display device which is configured to display an actuation of the adjustment device. The display device is preferably arranged together with the solenoid of the adjustment device on the first bearing element. By means of the display device a user is able to easily recognize whether the rotation is currently inhibited or not, or whether the brake is released or not. For example, the display device may comprise a light, in particular a LED, which flashes during actuation of the adjustment device. For example, the LED may be integrated into the electric circuit of the solenoid and may be automatically supplied with energy and flashes up due to this as soon as the solenoid is energized. A non-activation may for example be indicated in a way that the LED does not flash up or flashes in another color.

By attaching the actuator of the adjustment device and the display device together on the same bearing element, they may be especially easily coupled to each other to indicate an actuation. In particular due to the extension, a coil of the solenoid and the display device may be seamlessly assembled together in the outer ring, thus the display device may be visibly arranged on an outside on the bearing assembly without any complex wiring is needed. Thus, the two electric components are located in the same rotational reference system. In case the two electric components are however located in different bearing elements, they have to be contacted separately and independent from each other or are electrically connected by using an expensive sliding contact. In the present embodiment, it is however possible to integrate both electrically drivable components in or on one part. Cabling effort is thus reduced, and a mounting of sensitive electronic components is reduced to one assembly or one of the two bearing elements.

Further features, aspects and embodiments result from the following list of subjects:

1. Bearing arrangement (10) having at least one first bearing element (12) and one second bearing element (14), which are connected to each other along a common longitudinal axis (16) rotatably relative to one another, wherein the bearing arrangement (10) comprises a brake device (24), which inhibits the relative rotation of the two bearing elements (12, 14) to each other by means of a frictional force generated by the braking device (24), wherein the braking device (24) comprises a brake element (26) which is connected to the first bearing element (12), a counter surface (34) connected to the second bearing element (14), and at least one spring element (44) which presses the brake element (26) against the counter surface (34) by means of a spring force for generating the frictional engagement, and an actuable adjustment device (42) by means of which a contact force may be reduced by means of which the brake element (26) is pressed against the counter surface (34) due to the spring element (44) to modify a brake force which is acting on the two bearing elements (12, 14) during relative rotation to each other, wherein the counter surface (34) is formed on an extension (38) of the second bearing element (14), which is oriented transversely, in particular perpendicular, to the effective direction of the contact force, wherein said extension (38) is formed integrally with the second bearing element (14).
2. Bearing arrangement (10) according to subject 1, wherein the brake element (26) comprises an anchor disk (28) and a friction pad which is formed thereon, wherein the anchor disk (28) is connected to the first bearing element (12) in a rotatably fixed, but axially movable way along the longitudinal axis (16) by means of at least one guiding element (32).
3. Bearing arrangement (10) according to subject 2, wherein the adjustment device (42) comprises a solenoid (36) by means of which the anchor disk (28) is axially movable against the spring force.
4. Bearing arrangement (10) according to one of the subjects 2 or 3, wherein the at least one bearing element (44) is essentially arranged on the same diameter as the at least one guiding element (32).
5. Bearing arrangement (10) according to one of the preceding subjects, wherein one of the two bearing elements (12, 14) is formed as inner ring, and the other of the two bearing elements (12, 14) is formed as outer ring.
6. Bearing arrangement (10) according to one of the preceding subjects, wherein the extension (38) is formed as a step on the second bearing element (14), in particular on the second bearing element (14) which is configured as inner ring.
7. Bearing arrangement (10) according to one of the preceding subjects, wherein a transition between the extension (38) and the other second bearing element (14) is formed in a curved or angular way.
8. Bearing arrangement (10) according to one of the preceding subjects, wherein the extension (38) and/or the counter surface (34) extend(s) radially, in particular perpendicular, to the longitudinal axis (16) by means of the main extension surface thereof.
9. Bearing arrangement (10) according to one of the preceding subjects, wherein the counter surface (34) and/or a corresponding frictional surface of a friction element, in particular a friction pad (30), and/or the brake element (26) are arranged in a radially outer portion of the bearing arrangement (10).
10. Bearing arrangement (10) according to one of the preceding subjects, wherein the second bearing element (14), in particular the extension (38) thereof, extends essentially radially at most just as far as the first bearing element (12), and/or the brake element (26), in particular the anchor disk (28) thereof to the outside.
11. Bearing arrangement (10) according to one of the preceding subjects, wherein the adjustment device (42) comprises a display device (50) which is configured to display an actuation of the adjustment device (42), wherein the display device is preferably arranged together with the solenoid (36) of the adjustment device on the first bearing element (12).

Further features of the invention become obvious by the claims, the exemplary embodiment, and the FIGURE. The features and the combination of features mentioned in the specification above and the features and combination of features mentioned in the exemplary embodiments in the following may not only be used in the respective specified combination, but also in other combinations within the scope of the invention.

Here, the single FIGURE shows a section view of a bearing assembly.

The FIGURE shows, in a section view, a part of the bearing assembly 10 which comprises a first bearing element 12 formed as outer ring, and a second bearing element 14 formed as inner ring. In the present embodiment, the bearing assembly 10 is formed as an axial taper roller bearing, but may also be formed as another bearing design. Here, the first bearing element 12 forms at least one part of the bearing casing. In addition, also a cover may be provided. Alternatively or in addition, the casing is completely formed by the cover, in which then the first bearing element 12 is accommodated completely or nearly completely. This way, an unintended contact of the bearing assembly 10 may be prevented in a reliable way. The bearing assembly 10 is here formed as roller bearing, in which the two bearing elements 12, 14 may be rotated around the longitudinal axis 16 relative to one another. The two bearing elements 12, 14 thus roll down on the respective roller bodies 18 on each other, which are here formed as cylindrical bodies and are surrounded by the respective bearing rings 20 which may also be denoted as running disks. In the present embodiment, the outer ring forms here a stator which is for example fixed to a floor or a ceiling, in the present embodiment by means of a connection embodiment 22. The inner ring forms a rotor to which a further connection embodiment 22 is fastened, for example shaped as a cantilever. In the present embodiment, the respective connection embodiments 22 are releasably connected to the respective assigned bearing element 12, 14 by means of respective screw connections. Of course, also a reverse design is possible, in which the inner ring forms the stator, and the outer ring forms the rotor.

In addition, the bearing assembly 10, which supports a carrier arm system 60, also comprises a brake device 24 which may inhibit the relative rotation of the two bearing elements 12, 14 to each other. Hereto, the brake device 24 comprises a brake element 26, which in the present embodiment comprises an anchor plate or anchor disk 28 and a brake or friction pad 30 which is bonded thereon. The anchor plate/disk 28 is connected to the first bearing element 12 in a rotationally fixed but axially movable way by means of the respective guide pins 32. Hereto, the guide pins 32 are screwed in and pressed in holes of the first bearing element 12, for example, and extend through the corresponding through-openings of the anchor plate/disk 28. This way, an axial movement of the anchor plate/disk 28 is guided. The guide pins 32 are here evenly spaced along the periphery.

In the present embodiment, the axial direction is predetermined by the longitudinal axis 16, the radial direction is defined perpendicular to the longitudinal axis.

Further, the spring element 44 is shown which presses the anchor plate/disk 28 by means of the friction pad 30 against a counter surface 34 of the second bearing element 14. In the present embodiment, the spring element 44 is formed as a coil pressure spring. Here, the contact force causes a frictional engagement which counteracts the relative rotation of the two bearing elements 12, 14. In the present embodiment, the counter surface 34 is simply a surface which faces the friction pad 30 and is shown in a state in the FIGURE contacting a surface of a section of the second bearing element 14. Preferably, the bearing assembly 10 or the brake device 24 comprises a plurality of spring elements 44, which are distributed around the periphery (circumferentially), in particular evenly spaced to one another. The respective spring elements 44 may be arranged around the corresponding respective guide pin 32, respectively, in order to protect them against bending and to keep both the number of the required receiving holes and also the total installation space of the bearing assembly 10 small.

In order to be able to rotate the two bearing elements 12, 14 relative to each other in a fast way and with little effort, the bearing assembly 10 also comprises an adjustment device 42. The adjustment device 42 comprises a solenoid 36 which is arranged in a recess of the first bearing element 12. When current is applied, said solenoid 36 axially attracts the anchor plate 28 to it against the contact force of the spring elements 44, wherein said movement is guided by the guide pins 32. This way, the frictional engagement between the friction pad 30 and the counter surface 34 is released, and the two bearing elements 12, 14 are essentially able to rotate relative to each other without being inhibited. By means of the solenoid 36, the anchor plate/disk 28 may be lifted from the counter surface 34, and the inner ring and outer ring are freely movable against each other. This is also denoted as electromagnetic release of the brake.

The counter surface 34 is here formed on the integral extension 38 of the inner ring or of the second bearing element 14, respectively. The extension 38 here forms a step with respect to the rest of the bearing element 14. Said step axially extends beyond the first bearing element 12 or the outer ring. This way, the extension 38 or said step may extend in said axial portion radially further than the rest of the inner ring. In the present embodiment, the extension 38 radially extends at least as far as the rolling bodies 18. However, the extension 38 may also extend to a middle portion of the anchor plate/disk 38 or also up to the radially outer rim/edge thereof. In addition, the extension may also radially extend as far as a screw connection of the outer ring to the connection embodiment 22 or as the outer ring itself. There is also an axial overlapping between the extension 38 and the anchor plate/disk 28 and also an outermost portion of the first bearing element 12. Thus, the bearing assembly 10 is especially compact, and in addition an advantageous arrangement and size of the respective friction surfaces which are contacted in frictional engagement may be achieved.

This way, an especially large friction surface between the friction pad 30 and the surface 34 is provided which also provides an especially large lever arm relative to the longitudinal axis 16. Thus, an especially high frictional torque or brake torque inhibiting the rotation may be provided by using the same contact force of the spring elements 44, or for the same inhibiting frictional torque only a small contact force is required, respectively. Thus, the solenoid 36 may be formed especially small and weak, and/or any requirements concerning a precise adherence to a size of the gap 40 between the solenoid 36 and the anchor plate/disk 28 in a state providing a frictional engagement may be especially low. Actually, the gap 40 is a crucial size for dimensioning the strength of the solenoid 36 in order to be able to overcome the contact force of the spring elements 44 for releasing the frictional engagement. In the present embodiment, the gap 40 is for example only some tenths of a millimeter in size.

Due to the extension 38 which is formed integrally with the rest of the second bearing element 14, a separate pressure disk may be omitted, for example. Said pressure disk is usually connected to the second bearing element 14 by means of a thread in order to be able to adjust the gap 40. After adjustment, the thread is bonded to set the position of the pressure disk. Both, said setting and also manufacturing of the respective threads and assembly of separate pressure disks are thus not required for the bearing assembly 10. This way, the bearing assembly 10 is both especially cost-efficient and fast to manufacture and also to mount. Also, maintenance is thus easier. In addition, no training of the operator for correctly setting the gap 40 is required as this is predetermined by design and may well compensate respective manufacturing tolerances of the gap 40 by the solenoid 36 due to the small, required contact force of the brake device 24 even for low power.

The arrangement of the bearing assembly 10 may also be reversed in a way, that the inner ring, which is arranged on the bottom is connected to the cantilever which is located below it. In said case, a securing nut may be screwed in from above. A bearing casing is then connected on the upper side to a ceiling pipe/arm or a cantilever which extends above. In this case, the brake device 24 may be integrated in the outer bearing ring or the bearing casing on the bottom.

LIST OF REFERENCE NUMBERS

10 Bearing arrangement
12 First bearing element
14 Second bearing element
16 Longitudinal axis
18 Rolling body
20 Bearing ring
22 Connection embodiment
24 Brake device
26 Brake element
28 Anchor disk/plate
30 Friction pad
32 Guiding element/Guide pin
34 Counter surface
36 Solenoid
38 Extension
40 Gap
42 Adjustment device
44 Spring element

The invention claimed is:

1. A bearing arrangement (10) configured to support a carrier arm system (60), the bearing arrangement comprising:
a first bearing element (12) and a second bearing element (14), which are connected to each other along a common longitudinal axis (16) rotatably relative to each other;
a brake device (24), which inhibits the relative rotation of the two bearing elements (12, 14) to each other by means of a frictional force generated by the braking device (24),
wherein the braking device (24) comprises a brake element (26) which is connected to the first bearing element (12), a counter surface (34) connected to the second bearing element (14), and at least one spring element (44) which presses the brake element (26) against the counter surface (34) by means of a spring force for generating the frictional engagement; and
an actuable adjustment device (42) by means of which a contact force may be reduced by means of which the brake element (26) is pressed against the counter surface (34) due to the spring element (44) to modify a brake force which is acting on the two bearing elements (12, 14) during relative rotation to each other,
wherein the actuable adjustment device (42) comprises a display device (50) which is configured to display an actuation of the actuable adjustment device (42), the counter surface (34) is formed on an extension (38) of the second bearing element (14), which is oriented transversely to the effective direction of the contact force, wherein said extension (38) is formed integrally with the second bearing element (14).

2. The bearing arrangement (10) according to claim 1, wherein the brake element (26) comprises an anchor disk (28) and a friction pad which is formed thereon, wherein the anchor disk (28) is connected to the first bearing element (12) in a rotatably fixed, but axially movable way along the longitudinal axis (16) by means of at least one guiding element (32).

3. The bearing arrangement (10) according to claim 2, wherein the actuable adjustment device (42) comprises a solenoid (36) by means of which the anchor disk (28) is axially movable against the spring force.

4. The bearing arrangement (10) according to claim 2, wherein the at least one bearing element (44) is arranged on the same diameter as the at least one guiding element (32).

5. The bearing arrangement (10) according to claim 4, wherein respective guiding elements also serve as respective guiding of the respective spring elements (44).

6. The bearing arrangement (10) according to claim 1, wherein one of the two bearing elements (12, 14) is formed as inner ring, and the other of the two bearing elements (12, 14) is formed as outer ring.

7. The bearing arrangement (10) according to claim 1, wherein the extension (38) is formed as a step on the second bearing element (14).

8. The bearing arrangement (10) according to claim 1, wherein a transition between the extension (38) and the other second bearing element (14) is formed in a curved or angular way.

9. The bearing arrangement (10) according to claim 1, wherein the extension (38) and/or the counter surface (34) extend(s) radially.

10. The bearing arrangement (10) according to claim 1, wherein the counter surface (34) and/or a corresponding frictional surface of a friction pad (30), and/or of the brake element (26) are arranged in a radially outer portion of the bearing element (10).

11. The bearing arrangement (10) according to claim 1, wherein the second bearing element (14), extends essentially radially at most just as far as the first bearing element (12), and/or the brake element (26), to the outside.

12. The bearing element (10) according to claim 7, wherein the extension (38) is formed as a step on the second bearing element (14) which is configured as inner ring.

13. The bearing arrangement (10) according to claim 10, wherein the extension (38) and/or the counter surface (34) extends radially perpendicular to the longitudinal axis (16) by means of the main extension surface thereof.

14. The bearing arrangement (10) according to claim 2, wherein the second bearing element (14) extends essentially radially at most just as far as the anchor disk (28) to the outside.

15. The bearing arrangement (10) according to claim 3, wherein the display device is arranged together with the solenoid of the actuable adjustment device on the first bearing element (12).

* * * * *